United States Patent [19]

Singhe et al.

[11] Patent Number: 5,042,518

[45] Date of Patent: Aug. 27, 1991

[54] LIQUID ELIMINATION SYSTEM FOR VACUUM LINE

[76] Inventors: Upenda W. Singhe, 5187 Vista Miguel Dr., La Canada, Calif. 91101; Robert M. Galwey, 21843 E. Pinto Way, Walnut, Calif. 91789

[21] Appl. No.: 604,793

[22] Filed: Oct. 25, 1990

[51] Int. Cl.$^5$ ............................................. F04F 1/02
[52] U.S. Cl. ...................................... 137/2; 137/205; 137/209; 417/149
[58] Field of Search ............................ 137/205, 209, 2; 141/59; 417/148, 149, 126

[56] References Cited

U.S. PATENT DOCUMENTS

| | | | |
|---|---|---|---|
| 1,286,988 | 12/1918 | Fulton . | |
| 1,659,290 | 2/1928 | Gille . | |
| 1,913,376 | 6/1933 | Dinesen . | |
| 2,007,358 | 7/1935 | Anger | 303/88 |
| 2,485,232 | 10/1949 | Brown | 303/88 |
| 2,552,518 | 5/1951 | Churchman | 230/1 |
| 2,729,230 | 1/1956 | Kenney | 137/204 |
| 2,810,393 | 10/1957 | Fites | 137/204 |
| 3,130,741 | 4/1964 | Vetere | 137/115 |
| 3,329,215 | 7/1967 | Kane | 167/17 |
| 3,345,999 | 10/1967 | Boggs | 137/205 |
| 3,429,329 | 2/1969 | Berkley | 137/188 |
| 3,438,409 | 4/1969 | Bruce | 417/418 |
| 3,599,639 | 8/1971 | Spotz | 137/205 X |
| 3,845,778 | 11/1974 | Bridigum | 137/204 |
| 4,184,506 | 1/1980 | Vares | 137/205 |
| 4,605,400 | 8/1986 | Kurtz | 137/205 X |
| 4,637,440 | 1/1987 | Potter | 141/65 |

*Primary Examiner*—Alan Cohan
*Attorney, Agent, or Firm*—Fulwider, Patton, Lee & Utecht

[57] ABSTRACT

Apparatus and method for draining liquid from a vacuum line without interrupting the vacuum. The apparatus consists of a storage tank attached to a vacuum line by a drainage pipe having a one-way valve in the pipe permitting the flow of liquids away from the vacuum line and into the tank. A vacuum connection between the vacuum line and the tank through a three-way valve maintains the tank under vacuum while the three-way valve maintains the connection opened between the vacuum line and the tank. A high pressure line also connects to the tank through the three way valve. A sensor responsive to the level of fluid in the tank generates a signal to operate the three-way valve and simultaneously connect the high pressure line and disconnect the vacuum line from the tank. When the pressure condition in the tank is thus reversed, the tank is drained. The method described is that employed when using this apparatus to drain a vacuum line without interrupting the vacuum.

6 Claims, 1 Drawing Sheet

LIQUID ELIMINATION SYSTEM FOR VACUUM LINE

BACKGROUND OF THE INVENTION

This invention relates to the system for the removal of liquid from vacuum lines, and a method for accomplishing same. In particular, this invention relates to a system and a method wherein liquids can be continuously removed from a long vacuum line without interrupting the continuous vacuum maintained in that vacuum line.

An example of such a system is sometimes installed surrounding petroleum refineries. In an effort to purge ground water of certain liquids, particularly volatile liquids such as benzene, paraffin, and light hydrocarbons which may seep towards the ground water from the petroleum refineries, water wells are drilled surrounding the refinery. Water from these wells is pumped into holding tanks, and a vacuum condition is maintained in the head area of the holding tanks above the water. This in turn facilitates the evaporation of liquids from the water. The cleansed ground water is then pumped back into the ground. The continuous vacuum maintained by vacuum lines for the entire network of water wells gives rise to significant evaporation into those vacuum lines, which in turn gives rise to significant liquids condensing out into the vacuum lines. As those liquid condensates accumulate, it is important to be able to drain the liquid condensates from those vacuum lines. It is advantageous to do so in a manner which does not interrupt the vacuum maintained in the vacuum lines. It is also advantageous to do so in a manner which allows independently operating drainage units that may be interspersed at various drainage points, and thus not to require an extensive and elaborate vacuum line system to have a single drainage spot such as a low point to which all condensates would drain.

RELATED PRIOR ART

Numerous systems exist for purging condensates from high-pressure systems such as air pressure tanks. These may involve collecting condensates in the collection chamber, purge valve responsive to overall pressure within the system, purge valves responsive to the level of fluid collected from the pressure system, and even purge valves which operate periodically regardless of any of the above factors.

Because a vacuum system tends to draw material in from surrounding ambient pressurized system, however, draining such a system while maintaining a vacuum creates a different problem not solved by the above describe prior art.

SUMMARY OF THE INVENTION

According to the present invention, a system is provided wherein liquids (such as condensates) drain to a drainage point in a vacuum line (for example, a low point in that line) and from that point, through a drainage pipe into a drainage tank. It will be readily appreciated that in a long vacuum line, a number of different drainage points may be provided. This invention would provide a drainage mechanism for such a system and would allow, for example, the design of a long pipe line without the need to create a system in which drainage from the entire line would collect at a single point while providing drainage for such a design.

A vacuum is maintained in the drainage tank when communication is maintained from the vacuum line through a three-way valve to the drainage tank. A high-pressure system, such as a pressurized air line, is also connected to the three-way valve and ma be connected to the tank when the three-way valve shuts off the connection between the tank and the vacuum line and opens connection between the tank and the high-pressure line.

When the tank is under vacuum, liquid drains into the storage tank through the drainage pipe communicating between the drainage point in the vacuum line and the storage tank. The storage tank is located lower than the vacuum line, and the interior of the tank is under the same low pressure as the vacuum line, so liquids such as condensates which have accumulated at the drainage point in the vacuum line would drain into the storage tank.

A sensor, responsive to the level of liquid in the drainage tank, signals the three-way valve when the liquid collected in the tank reach a pre-determined high level. That signal is transmitted to a valve actuator which operates the three-way valve to close the connection between the vacuum line from the storage tank and simultaneously open the connection between a high-pressure gas system and the storage tank. The pressurized gas enters the storage tank and forces the liquid out of the tank through a purge line and into a liquid collection line.

As the liquid is purged from the collection tank and its level within the tank falls, the sensor detects the level of liquid in the tank; when the level reaches a predetermined low level, the sensor generates an appropriate signal which is then transmitted to the valve actuator to again operate the three-way valve, this time to close the connection between the pressurized line and the tank and simultaneously reopen the connection between the vacuum line and the tank, thus restoring the vacuum condition within the tank.

The cycle is then repeated; liquid drains into the tank under vacuum conditions until the pre-determined high level of liquid is again reached; when that level is reached, the connection between the tank and vacuum line is closed, the connection between the pressurized line and the tank is opened, and the collected liquid is purged into the liquid collection system; when the level of liquid in the tank falls to the predetermined low level, the three-way valve operates to close the connection to the pressurized line and reconnect the vacuum line to the tank.

A one-way valve in the drainage pipe allows liquid to drain from the vacuum into the storage tank, but does not allow the contents of the tank to be drawn into the vacuum line. Thus, when the three-way valve closes the connection between the vacuum line and the tank, and the contents of the tank become pressurized by the connection between the pressure line and the tank, the contents of the tank including the pressurized gas above the liquid and the liquid are not forced into the vacuum line.

Similarly, a one-way valve in the purge line between the tank and the liquid collection system prevents liquid in that system from being drawn back into the tank when a vacuum condition is restored within the tank.

Because the vacuum line connection to the tank/liquid collection system is not open while the tank interior is pressurized, the vacuum in that line can be maintained without interruption during the entire cycle. Because each drainage tank is purged periodically responsive only on the fluid level in that tank, the system is independent of other similar systems, and any number of systems can be attached along a long vacuum line, making this method ideal for eliminating liquids from a long vacuum line, especially where topography may make it impractical to design the system to have a single low drainage point such as when such a line is built surrounding a petroleum refinery. The liquid condensates themselves which are collected by this system may be purged into a contained liquid collection system for collection or treatment, making it ideal for collection of possibly hazardous wastes such as those which may drain from the vacuum system of such a petroleum refinery. The ability of the vacuum to be continuously maintained without interruption for drainage makes such a system ideal for operation wherein continuous vacuum conditions are required.

It is an object of this invention to provide a liquid elimination system for use on a vacuum line.

It is another object of this invention to provide for a liquid elimination system which can operate to eliminate liquid from the vacuum line without the need to discontinue the vacuum in that vacuum line.

It is another object of this invention to provide a liquid elimination system responsive to the volume of liquid to be eliminated.

It is another object of this invention to provide a collection system to collect and transport liquid eliminated from the vacuum line.

It is a final object of this invention to provide a method whereby the previously listed objects may be accomplished.

DESCRIPTION OF THE DRAWING

The sole FIGURE is a diagram of the system of the invention with the collection tank and float tank each shown as transparent and in perspective.

DESCRIPTION OF THE PREFERRED EMBODIMENT

Figure 1:
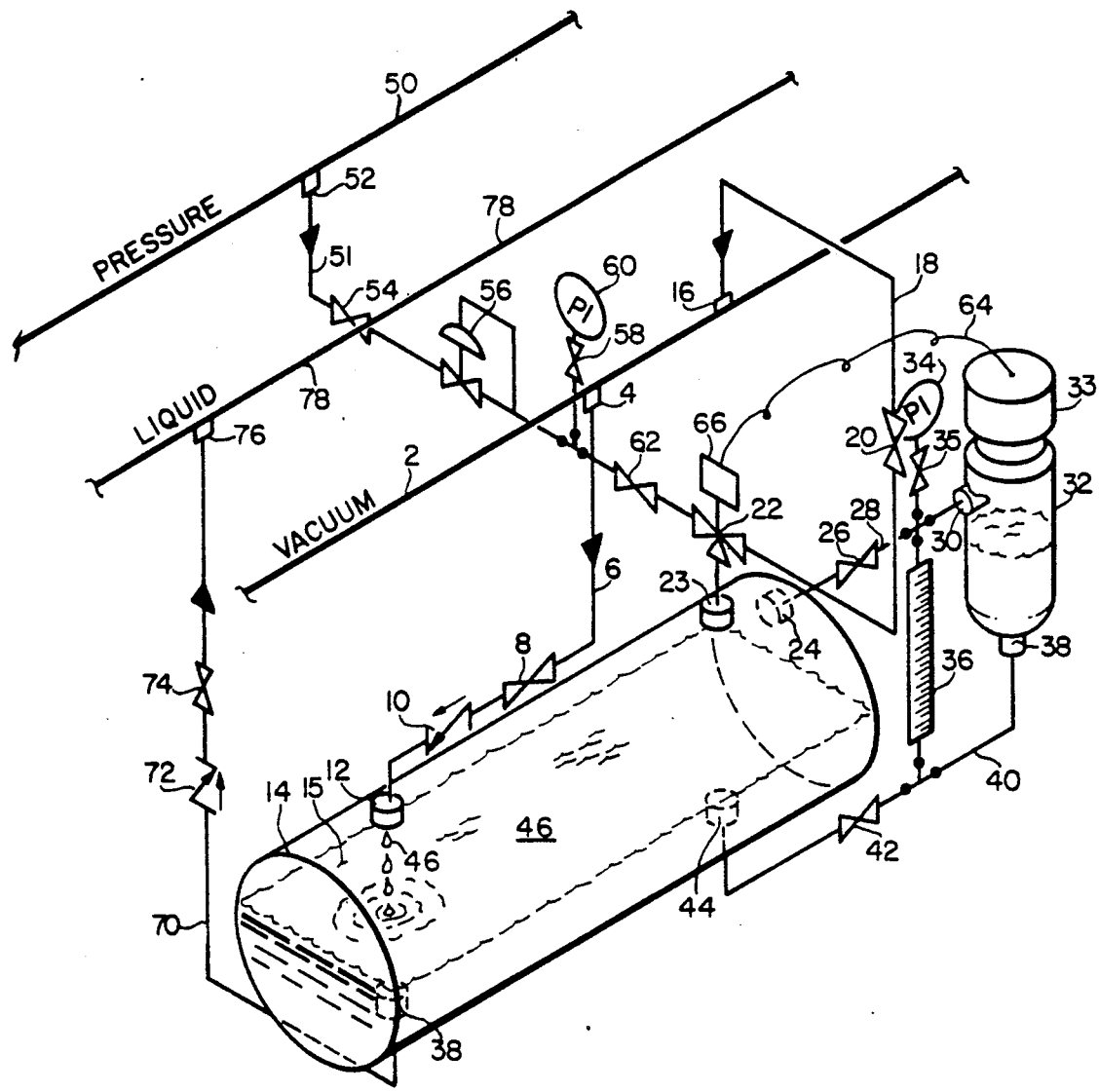

Referring specifically to the drawing of FIG. 1, in the preferred embodiment of the invention, there is a vacuum line 2 having a drainage port 4 therein. The vacuum in the line might be maintained at, for example, 5 to 10 psi below atmospheric pressure. Liquid condensing in the vacuum line 2 and collecting in the drainage port 4 empties through drainage pipe 6. The drainage pipe is of appropriate dimensions, for example one inch pipe, and as with the other pipes of the system, is of appropriate material to be resistant to the condensates, for example the pipe may be made of ASTM 106 grade B steel. A block valve 8 is contained in the drainage pipe 6 in case of rupture of the system downstream from safety valve 8, the valve may close and thereby prevent the loss of vacuum in vacuum line 2. The valve is of an appropriate type, for example, a firesafe class 150 gate valve or equivalent ball valve.

A one-way valve 10 in the drainage pipe 6 allows condensate to drain away from drainage port 4 but does not permit liquid or gases (as will be explained later) to be drawn through drainage pipe 6 back into vacuum line 2. The one-way valve should be appropriate for the pressures involved and resistant to corrosion from the condensates encountered, for example, the valve may be a lift-type check valve.

Liquid condensates thus drain from drainage pipe 6 and enter a storage tank 14 through inlet port 12. The storage tank provided should be of appropriate size and material, for example, it might be fabricated of ASTM 106 carbon steel 6" pipe or of other materials approved per ASME 8 pressure vessel code.

While liquids are draining from vacuum line to into storage tank 14, a vacuum is maintained within the storage tank 14. A vacuum port 16 in the vacuum line 2 is connected by pipe 18, through block valve 20 and three-way valve 22 to three-way port 23. The three-way valve must be operable in response to a signal to close the connection between the three-way port 23 and the vacuum line 2 and simultaneously open a connection between the tank 14 and the pressure line 50, as will be described below. It must also be of sufficient capacity to allow passage of sufficient volume of ga to pressurize and depressurize the tank. An appropriate valve might be, for example, the three-way valve with pneumatic actuator currently sold by CashCo as Demi Valve, catalog item #DP-TB. The collection tank 14 has an equalization port 24 connected to an equalization pipe 28 through the block valve 26. The equalization pipe 28 in turn connects to a float tank 32 by mean of float tank pressure port 30. Thus the pressure in the collection tank 14 is the same as the pressure in float tank 32.

The float tank acts as a sensor to sense the level of fluid therein and to generate an appropriate signal when that level reaches either a predetermined high level or predetermined low level. In addition, the walls of the float chamber should be appropriately resistant to corrosion by the expected liquid condensates. An example of an appropriate float tank is the float tank manufactured by Omnitrol and marketed under Model No. P663-FG-150-WR. Such a float tank has pneumatic chamber level controls with a 3" diameter displacer body size. It has an actuator 33 to generate a pneumatic signal in the range of 3-15 psi corresponding to high or low levels of liquid in the float chamber.

The fluid level in the float tank 32 is the same as that in the collection tank 14. The float tank is connected to the collection tank below the fluid level by means of float tank fluid line 40 through block valve 42. This line connects to collection 14 by means of fluid level exit port 44 and to float tank 32 by means of float tank fluid port 38.

Also connected to float tank fluid line 40 is fluid level indicator 36. That fluid level indicator is connected between the equalization pipe 28 and float tank fluid line 40. Thus the fluid level maintained in the fluid level indicator 36 would be the same as that in the float tank 32 and collection tank 14. A pressure indicator 34 is connected through a block valve 35 to equalization pipe 28 which pressure indicator would show the pressure above the fluid in the float tank 32, fluid level indicator 36, and collection tank 14. An appropriate pressure indicator might be a ½ inch bottom connection 0-60 psi pressure gage.

A sensor in the float tank (sensor not shown) generates a signal when the liquid level reaches a predetermined high level. That signal is transmitted along the pneumatic signal line 64 to the valve actuator 66. The valve actuator can be operated in response to either an electrical signal or pneumatic signal, depending on the actuator employed and the signal type generated. The actuator operates the three-way valve 22 to initiate the purge cycle in the system as will be described.

When the fluid level reaches the predetermined high level and the three-way valve 22 is activated, that valve closes the connection between the three- way port 23 and the vacuum line and opens a connection between pressure line 50 and the three-way port 23. Thus, the head area within the storage tank 14 above the liquid 46 ceases to be under a vacuum and becomes pressurized.

The storage tank 14 is connected to the pressure line 50 through pressure conduit 51. The connection between the pressure line 50 and the conduit 61 is at pressure port 52. The conduit 51 has a pressure regulator 56 therein and a block valve 54 between said pressure line 50 and said pressure regulator 56. The pressure regulator pressure indicator 60, attached through block valve 58 indicates the pressure in said pressure line downstream of the pressure regulator. Said pressure line is connected through block valve 55 and 62 to three-way valve 22. When the valve actuator 66 causes the three-way valve to interrupt the connection between storage tank 14 and vacuum line 2 and simultaneously open the connection between collector tank 14 and pressure line 50, the pressure above the condensate 46 increases from a vacuum condition to a high pressure condition. That pressure simultaneously increases above the fluid in float tank 32 since the equalization pipe 28 connects the head space of both the float tank and the collector tank. That increased pressure forces the collected liquid 46 from the collector tank 14 and the float tank 32 out through purge port 38. That condensate is forced through purge line 70, one-way valve 72, block valve 74 and into the liquid line port 76 which is the connection to liquid line 78.

When the condensate level in float tank 32 drops to a predetermined low level, a signal is generated across signal line 64 to valve actuator switch 66. This then interrupts the connection between the pressure line 50 and collection tank 14 and reestablishes the connection between the vacuum line 2 and collection tank 14. A vacuum is reestablished within the collection tank, it then collects liquid condensate draining out of drainage port 4 until such time as the condensate level 46 reaches the predetermined high level, at which point the cycle repeats.

Because one-way valve 72 is positioned between the liquid line 78 and the collection tank 14, and permits liquid to flow only toward the liquid line 78 and away from collection tank 14, when a vacuum condition is reestablished within the collection tank 14, condensate in the liquid line 78 cannot be drawn back into the collection tank 14. Likewise, one-way valve 10 prevents gas under pressure from being drawn into vacuum line 2 when the tank is in the pressurized condition.

In practice, the invention might be installed, for example, on a system for cleaning ground water around a petroleum refinery. In that system, water wells are drilled in numerous locations surrounding the refinery. Water from the wells is pumped into large water tanks. A vacuum is maintained above the water in the tanks, enhancing the evaporation of any volatile liquids which may be contained in the water such as benzene, paraffin and light hydrocarbons in general. The water, thus cleansed, is then returned into the ground. In this continuous process, the ground water is cleansed and returned, and thus protected from volatile liquids that might otherwise seep from the refinery into the ground water. Such a system, however, requires an extensive vacuum line, sometimes several miles long, the configuration of which is determined to some extent by the topography of the refinery. Thus designing such a system to have only one or very few low points for collection of condensates is impractical. Because of the independent operation of each of the condensate eliminator systems of the invention, it is possible to position any number of the systems along the vacuum line, thereby eliminating the need to create a central drainage location by the design of the vacuum pipe.

In addition, the amount of liquid being purged from the ground water might vary significantly from time to time and from location to location. Since each liquid eliminator system of the invention is regulated in its collection/purge cycle only by the level of condensate fluid being collected in its own storage tank, the rate of collection/purge activity in each one is self-governing and regulated by the rate of condensate elimination required by the system. If several are installed along the same vacuum line, each thus operates independently of the other, so no central coordination is necessary, and should one be disabled or need repair, the others will continue to function.

In addition, since the liquid condensate purged from the system is pumped into a central collecting pipe, that pipe could collect liquid purged from multiple condensate eliminators and significantly simplify the ultimate disposal or treatment of condensates thus collected.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. A liquid elimination system for collecting liquids from a vacuum line under continuous vacuum and generating a signal when said collected liquid accumulates to a certain predetermined high level, such system comprising:
    a vacuum line having a low point therein, said vacuum line forming a drainage port at said low point;
    a drainage conduit having a vacuum line end and a tank end, said drainage conduit connected at said vacuum line end to said drainage port;
    a one-way valve in said drainage conduit, said valve permitting fluid to flow away from said vacuum line and toward said tank, and said valve obstructing fluid from flowing toward said vacuum line and away from said tank;
    a collecting tank having an interior cavity and an exterior surface, said surface forming an inlet port and an outlet port therein, said inlet port connected to said tank end of said drainage conduit, said cavity communicating with said drainage conduit;
    an outlet conduit connected to said outlet port of said collecting tank and communicating with said cavity;
    means for generating a high level signal;
    sensor means for sensing the level of liquid in said cavity and activating said high level signal generating means to generate a high level signal when such liquid level in said cavity reaches such predetermined high level;
    a vacuum connector communicating between said cavity and said vacuum line; and
    valve means for closing said vacuum connector.

2. A liquid eliminator as in claim 1 wherein:
    said valve means comprises an automatic valve actuated by said high level signal.

3. A liquid eliminator as in claim 1 wherein:
said sensor is a float tank, said float tank comprising:
an internal float chamber;
a liquid port, said port communicating with said cavity below such liquid level in said cavity;
a pressure port, said pressure port communicating with said cavity above such liquid level in said cavity whereby liquid collecting within said cavity simultaneously collects within said chamber, whereby the pressure above said liquid in said cavity is the same as the pressure above said liquid in said chamber, and when said liquid collects to such predetermined high level, said float tank activates said high level signal generating means.

4. A liquid elimination system for collecting liquids from a vacuum line under continuous vacuum and generating a signal when the liquid level accumulates to a certain predetermined high level such system comprising:
a vacuum line having a low point therein where liquid collects, said vacuum line forming a drainage port at said low point;
a drainage conduit having a vacuum line end and a tank end, said drainage conduit connected at said vacuum line end to said drainage port;
a first one-way valve in said drainage conduit, said first one-way valve permitting fluid to flow away from said vacuum line and toward said tank, and said first one-way valve obstructing fluid from flowing toward said vacuum line and away from said tank;
a collecting tank having an interior cavity and an exterior surface, said surface forming an inlet port and an outlet port therein, said inlet port connected to said tank end of said drainage conduit, said cavity communicating with said drainage conduit;
an outlet conduit connected to said outlet port of said collecting tank and communicating with said interior cavity, said outlet conduit having a second one-way valve therein, said second one-way valve permitting fluid to flow within said outlet conduit away form said cavity and preventing fluid from flowing within said outlet conduit toward said cavity;
means for generating a high level signal;
sensor means for sensing the level of liquid in said cavity and activating said signal generating means to generate a signal when said condensate levels in said tank reach such predetermined high level;
a vacuum connector, having a vacuum port end and a valve end, said vacuum port end connected to said vacuum line at said vacuum port;
a pressure conduit forming a pressure port end and a valve end, said pressure port end connected to said pressure line at said pressure port;
a three-way valve having a vacuum connector port, a pressure conduit port, and a storage tank port, said pressure conduit port connected to said valve end of said pressure conduit, said vacuum connector port connected to said valve end of vacuum connector, said storage tank port communicating with said cavity, said three-way valve responsive to said high level signal such that said signal causes said three-way valve to shut off communication between said cavity and said vacuum connector and simultaneously open communication between said cavity and said pressure conduit.

5. A liquid elimination system as in claim 4 additionally responsive to a predetermined low level of liquid in said storage tank further comprising:
low level signal means;
low level sensor means responsive to liquid level in said tank, said low level sensor means activating said low level signal means when liquid level in such tank reaches said predetermined low level to generate a low level signal;
said three-way valve means responsive to said low level signal wherein said low level signal activates said three-way valve to close communication between said pressure conduit and said cavity and simultaneously open communication between said vacuum connector and said cavity.

6. A method for eliminating liquid from a vacuum line comprising:
collecting liquid in a vacuum line;
draining said collected liquid through a one-way valve into a collecting tank;
connecting said vacuum line to said storage tank;
sensing said liquid level in said tank;
generating a signal when said liquid level reaches a predetermined high level;
closing said connection between said vacuum line and said storage tank in response to said signal;
draining said storage tank.

* * * * *

UNITED STATES PATENT AND TRADEMARK OFFICE
CERTIFICATE OF CORRECTION

PATENT NO. : 5,042,518
DATED : August 27, 1991
INVENTOR(S) : Upenda W. Singhe; Robert M. Galwey It is certified that error appears in the above-identified patent and that said Letters Patent is hereby corrected as shown below:

Column 1, line 7, replace "the system" with --a system--.

Column 1, line 47, replace "valve" with --valves--.

Column 1, line 53, between "from" and "surrounding" insert --the--.

Column 1, line 55, replace "different" with --difficult--.

Column 2, line 7, replace "ma" with --may--.

Column 2, line 23, replace "reach" with --reaches--.

Column 3, line 4, replace "on" with --to--.

Column 4, line 7, replace "to" with --2--.

Column 4, line 17, replace "ga" with --gas--.

UNITED STATES PATENT AND TRADEMARK OFFICE
CERTIFICATE OF CORRECTION

PATENT NO. : 5,042,518
DATED : August 27, 1991
INVENTOR(S) : Upenda W. Singhe; Robert M. Galwey It is certified that error appears in the above-identified patent and that said Letters Patent are hereby corrected as shown below:

Column 4, line 45, between "collection" and "14" insert --tank--.

Column 5, line 13 & 14, delete "pressure regula-tor".

Column 5, line 38, replace "A" with --As--.

Column 7, line 43, replace "form" with --from--.

Signed and Sealed this

Second Day of February, 1993

Attest:

STEPHEN G. KUNIN

*Attesting Officer*   Acting Commissioner of Patents and Trademarks